United States Patent
Singh

(10) Patent No.: US 12,260,301 B2
(45) Date of Patent: Mar. 25, 2025

(54) DATA GENERATION AND ANNOTATION FOR MACHINE LEARNING

(71) Applicant: SAP SE, Walldorf (DE)

(72) Inventor: Mithilesh Kumar Singh, Ara (IN)

(73) Assignee: SAP SE, Walldorf (DE)

( * ) Notice: Subject to any disclaimer, the term of this patent is extended or adjusted under 35 U.S.C. 154(b) by 999 days.

(21) Appl. No.: 17/023,766

(22) Filed: Sep. 17, 2020

(65) Prior Publication Data

US 2022/0083907 A1  Mar. 17, 2022

(51) Int. Cl.
*G06N 20/00* (2019.01)
*G06T 11/20* (2006.01)
*G06V 30/10* (2022.01)
*G06V 30/148* (2022.01)

(52) U.S. Cl.
CPC .............. *G06N 20/00* (2019.01); *G06T 11/20* (2013.01); *G06V 30/153* (2022.01); *G06T 2210/12* (2013.01); *G06V 30/10* (2022.01)

(58) Field of Classification Search
CPC ........ G06N 20/00; G06V 30/10; G06V 30/00; G06V 30/153; G06V 30/148; G06V 30/14; G06T 11/20; G06T 2210/12; G06T 2210/00
USPC ......................................................... 706/12
See application file for complete search history.

(56) References Cited

U.S. PATENT DOCUMENTS

| | | | | |
|---|---|---|---|---|
| 10,474,564 B1* | 11/2019 | Konyshev | ........... | G06F 11/3688 |
| 10,719,301 B1* | 7/2020 | Dasgupta | ................. | G06F 8/34 |
| 10,846,106 B1* | 11/2020 | Curic | ...................... | G06F 16/35 |
| 10,970,530 B1* | 4/2021 | Adam | .................. | G06V 30/416 |
| 11,176,443 B1* | 11/2021 | Selva | ...................... | G06F 18/25 |
| 2005/0055633 A1* | 3/2005 | Ali | ......................... | G06F 16/88 715/236 |
| 2008/0195958 A1* | 8/2008 | Detiege | ................ | G06V 30/412 715/765 |
| 2013/0124480 A1* | 5/2013 | Chua | ...................... | G06F 16/48 707/E17.005 |
| 2014/0019843 A1 | 1/2014 | Schmidt | | |
| 2014/0337705 A1 | 11/2014 | Glover et al. | | |
| 2015/0220312 A1* | 8/2015 | Jemiolo | .................. | G06F 3/048 715/234 |

(Continued)

OTHER PUBLICATIONS

Zhou et al., "Applying machine learning to automated information graphics generation", IBM Systems Journal, vol. 41, No. 3, 2002, pp. 504-523. (Year: 2002).*

(Continued)

*Primary Examiner* — Hwei-Min Lu
(74) *Attorney, Agent, or Firm* — SCHWEGMAN LUNDBERG & WOESSNER, P.A.

(57) ABSTRACT

A data annotation server accesses a request from a machine learning server for annotated images of a user interface containing a specified user interface element. The data annotation server programmatically determines whether user interfaces generated by an application server include the specified user interface element. If so, an image of the user interface is stored and a location or bounding box of the user interface element is determined. The stored image of the user interface is annotated with the determined location of the user interface element. The image and the annotation are provided to the machine learning server, which uses the images and annotations to train a machine learning model.

20 Claims, 9 Drawing Sheets

(56) References Cited

U.S. PATENT DOCUMENTS

| | | | | |
|---|---|---|---|---|
| 2016/0283222 | A1* | 9/2016 | Yaros | G06F 8/34 |
| 2018/0203674 | A1* | 7/2018 | Dayanandan | G06F 8/35 |
| 2019/0087691 | A1* | 3/2019 | Jelveh | G06F 18/2178 |
| 2019/0250891 | A1* | 8/2019 | Kumar | G06T 7/70 |
| 2020/0019418 | A1* | 1/2020 | P K | G06F 9/453 |
| 2020/0133644 | A1* | 4/2020 | Hou | G06F 40/14 |
| 2020/0167153 | A1* | 5/2020 | Wang | G06F 11/36 |
| 2020/0234025 | A1* | 7/2020 | Cohen | G06V 20/698 |
| 2020/0242154 | A1* | 7/2020 | Haneda | G06F 16/535 |
| 2021/0073977 | A1* | 3/2021 | Carter | G06T 11/20 |
| 2021/0192394 | A1* | 6/2021 | McKay | G06N 3/091 |
| 2021/0349587 | A1* | 11/2021 | Bigham | G06F 3/04886 |

OTHER PUBLICATIONS

Hetherington et al., "Embodying and Extracting Data in Web3D Models of Proposed Building Developments", Computer Graphics, Imaging and Visualisation (CGIV 2007), Aug. 2007, pp. 528-534. (Year: 2007).*

Moran, et al., "Machine Learning-Based Prototyping of Graphical User Interfaces for Mobile Apps", arXiv Article: 1802.02312, Feb. 7, 2018. (Year: 2018).*

Moses, Olafenwa, "Building your private Cloud AI API", [Online]. Retrieved from the Internet: <URL: https://medium.com/deepquestai/building-your-private-cloud-ai-api-50e93a83a6ce>, (Jun. 1, 2019), 10 pgs.

Moses, Olafenwa, "Object Detection Training—Preparing your custom dataset", [Online]. Retrieved from the Internet: <URL: https://medium.com/deepquestai/object-detection-training-preparing-your-custom-dataset-6248679f0d1d>, (Aug. 1, 2019), 10 pgs.

* cited by examiner

400

| 410 | REQUEST TABLE | | |
|---|---|---|---|
| 420 | REQUEST ID | ELEMENT IDENTIFIER | SIZE |
| 430A | 123 | 'SEARCHBUTTON':["//INPUT[@TYPE='SEARCH']"] | 500 |
| 430B | 234 | 'TEXTFIELD':["//INPUT[@TYPE='SEARCH']"] | 1000 |
| 430C | 456 | 'CLICKBUTTON':["//INPUT[@TYPE='SUBMIT', "//A[CONTAINS(TEXT(), '')]"] | 5K |

| 440 | ANNOTATION TABLE | | | |
|---|---|---|---|---|
| 450 | REQUEST ID | FILENAME | BOUNDING BOX | NAME |
| 460A | 123 | DATA/123/1.PNG | 46, 0, 94, 46 | SEARCHBUTTON |
| 460B | 234 | DATA/234/1.PNG | 1738, 0, 1786, 46 | TEXTFIELD |
| 460C | 456 | DATA/456/3.PNG | 188, 235, 218, 273 | CLICKBUTTON |

*FIG. 4*

DATA GENERATION AND ANNOTATION FOR MACHINE LEARNING

TECHNICAL FIELD

The subject matter disclosed herein generally relates to data generation and labeling for machine learning. Specifically, the present disclosure addresses systems and methods to automate data generation, collection, and annotation for training deep learning object detection and segmentation algorithms.

BACKGROUND

Machine Learning (ML) is an application that provides computer systems the ability to perform tasks, without explicitly being programmed, by making inferences based on patterns found in the analysis of data. ML explores the study and construction of algorithms, also referred to herein as models, that may learn from existing data and make predictions about new data. The dimensions of the input data are referred to as features.

Annotated data is used to train models. For example, an image recognition model may be trained on a training set comprising a number of images, with each image in the training set having a corresponding label. Typically, the labels are added by people. For example, a user interface may be presented that includes an image and provides one or more user interface elements operable to receive the annotation for the image. Thus, the creation of annotated data is labor-intensive and subject to human error.

The model is trained using a training set. Each element of the training set is an input for the machine learning model (e.g., an input image) and a corresponding label. The label for each input is the output that the machine learning model should generate for the input. By processing the training set, the internal variables of the machine learning model are adjusted so that the error rate of the machine learning model is minimized. If the training set is large and representative of data not included in the training set, the trained model will have comparable results on other data.

BRIEF DESCRIPTION OF THE DRAWINGS

Some embodiments are illustrated by way of example and not limitation in the figures of the accompanying drawings.

FIG. 4 is a block diagram of a database schema storing requests and annotations, according to some example embodiments, suitable for use in data generation and annotation for machine learning.

DETAILED DESCRIPTION

Figure 1:
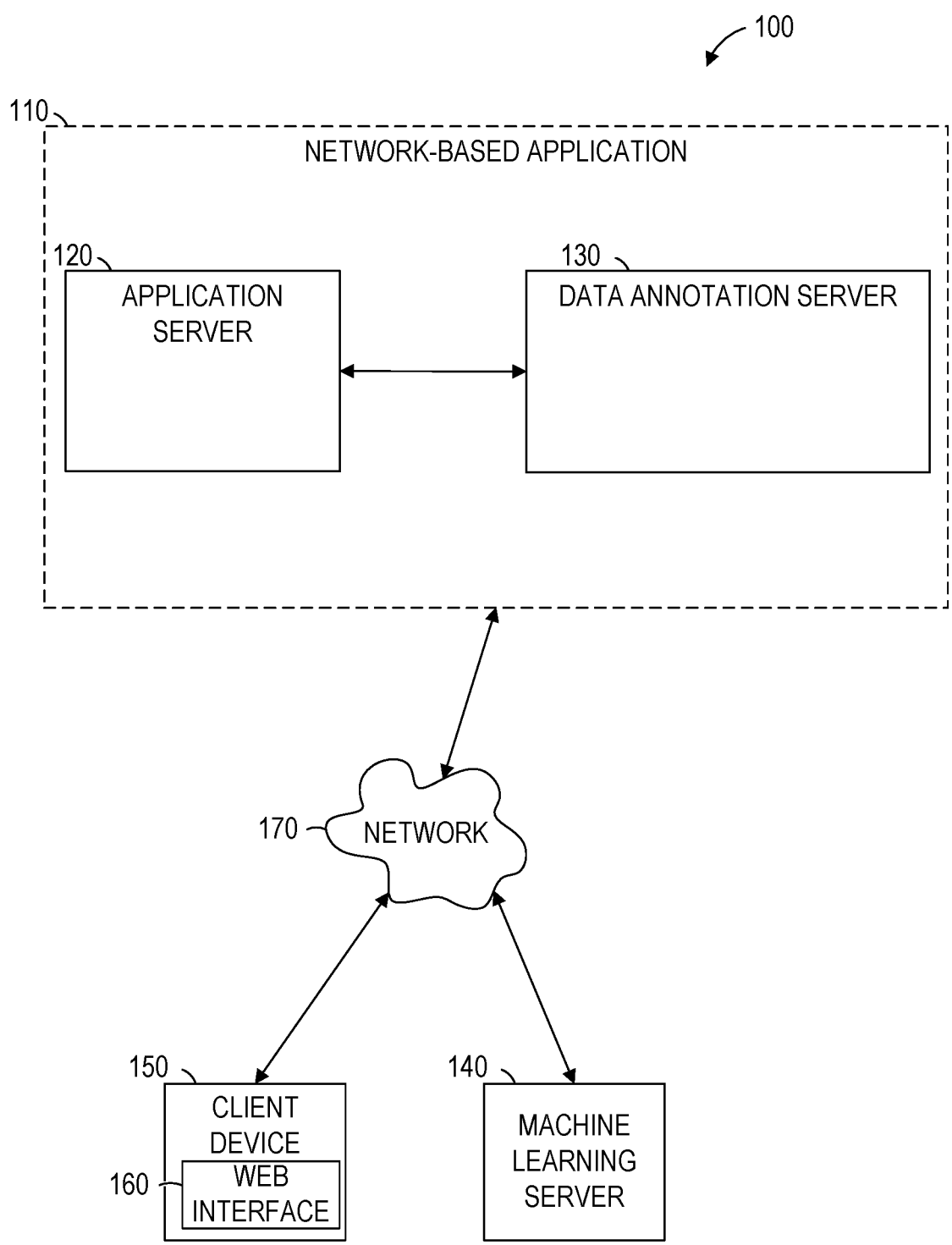
FIG. 1 is a network diagram illustrating a network environment suitable for data generation and annotation for machine learning, according to some example embodiments.

Example methods and systems are directed to data generation and labeling for machine learning. A trained ML model may take an image as an input and generate, as an output, a Boolean value that indicates whether the image depicts a particular type of object (e.g., a bird, a robin, a fruit, an apple, a text entry field, a user name field, or any suitable combination thereof). As another example, the trained ML model may take the image as the input and generate, as the output, an integer value that indicates what kind of object, if any, is depicted in the image. As yet another example, the trained ML model may take the image as the input and generate, as the output, four numeric values that indicate a bounding box around a detected object depicted in the image.

A data annotation server accesses a request for annotated images of a user interface containing a specified user interface element. The data annotation server programmatically determines whether user interfaces generated by an application server include the specified user interface element. If so, an image of the user interface is stored and a location or bounding box of the user interface element is determined by communication with the application server, analysis of metadata corresponding to the user interface, analysis of code used to render the user interface, or any suitable combination thereof. The stored image of the user interface is annotated with the determined location of the user interface element.

Thus, a machine learning server is enabled to request a set of training images comprising user interface images and corresponding annotation. After training an ML model using the requested set of training images, the ML model is able to determine the location or bounding box of the user interface element in other user interface images without communicating with the application server or accessing metadata or code associated with the user interface.

Compared with prior art systems in which images are annotated by hand based on human recognition of the location or bounding box of a user interface element instead of a programmatic determination of the location or bounding box, the systems and methods described herein are less labor-intensive and less error-prone. Reducing the frequency of errors in the training set may reduce the amount of training performed before the ML model achieves acceptable performance (e.g., an accuracy rate of at least 95%), improve the performance of the ML model, or both. Automating the annotation also reduces computing resources expended in presenting an annotation user interface, receiving annotation from a user, transmitting the annotation results over a network from a user device to an annotation server, or any suitable combination thereof.

When these effects are considered in aggregate, one or more of the methodologies described herein may obviate a need for certain efforts or resources that otherwise would be involved in annotating training data, training an ML model, or using an ML model. Computing resources used by one or more machines, databases, or networks may similarly be reduced. Examples of such computing resources include processor cycles, network traffic, memory usage, data storage capacity, power consumption, and cooling capacity.

FIG. 1 is a network diagram illustrating a network environment 100 suitable for data generation and labeling for machine learning, according to some example embodiments. The network environment 100 includes a network-based application 110, a machine learning server 140, a client device 150, and a network 170. The network-based application 110 is provided by an application server 120 in communication with a data annotation server 130.

The application server 120 provides an application to the client device 150 via a web interface 160. The application server 120, the data annotation server 130, the machine learning server 140, and the client device 150 may each be implemented in a computer system, in whole or in part, as described below with respect to FIG. 9.

The application server 120 receives a request from the client device 150 for a web interface. In response to the request, the application server 120 sends a web page (e.g., one or more files comprising hypertext markup language (HTML), cascading style sheets (CSS), JavaScript, or any suitable combination thereof) via the network 170 to the client device 150. The web interface 160 (e.g., a web browser running on the client device 150) generates the user interface for presentation on a display device of the client device 150 based on the data received from the application server. The user interface comprises a set of user interface elements (e.g., input controls, images, text, or embedded video).

The data annotation server 130 receives a request from the machine learning server 140 for annotated images of the user interface provided by the application server 120. The request may identify a user interface element to be annotated. When sending a web page to the client device 150, the application server 120 also sends the web page to the data annotation server 130. Alternatively, the data annotation server 130 acts as an intermediary between the application server 120 and the client device 150, receiving the web page from the application server 120 and forwarding the web page to the client device 150.

The data annotation server 130 generates an image of the web page and annotates the image. The annotation for the image indicates whether the image includes the user interface element of the request, a location of the user interface element in the image, a size of the user interface element in the image, or any suitable combination thereof. The generated image and annotation are provided to the machine learning server 140 for use in training an ML model.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIG. 9. As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database. Moreover, any two or more of the machines, databases, or devices illustrated in FIG. 1 may be combined into a single machine, database, or device, and the functions described herein for any single machine, database, or device may be subdivided among multiple machines, databases, or devices.

The application server 120, the data annotation server 130, the ML server 140, and the client device 150 are connected by the network 170. The network 170 may be any network that enables communication between or among machines, databases, and devices. Accordingly, the network 170 may be a wired network, a wireless network (e.g., a mobile or cellular network), or any suitable combination thereof. The network 170 may include one or more portions that constitute a private network, a public network (e.g., the Internet), or any suitable combination thereof.

Figure 2:
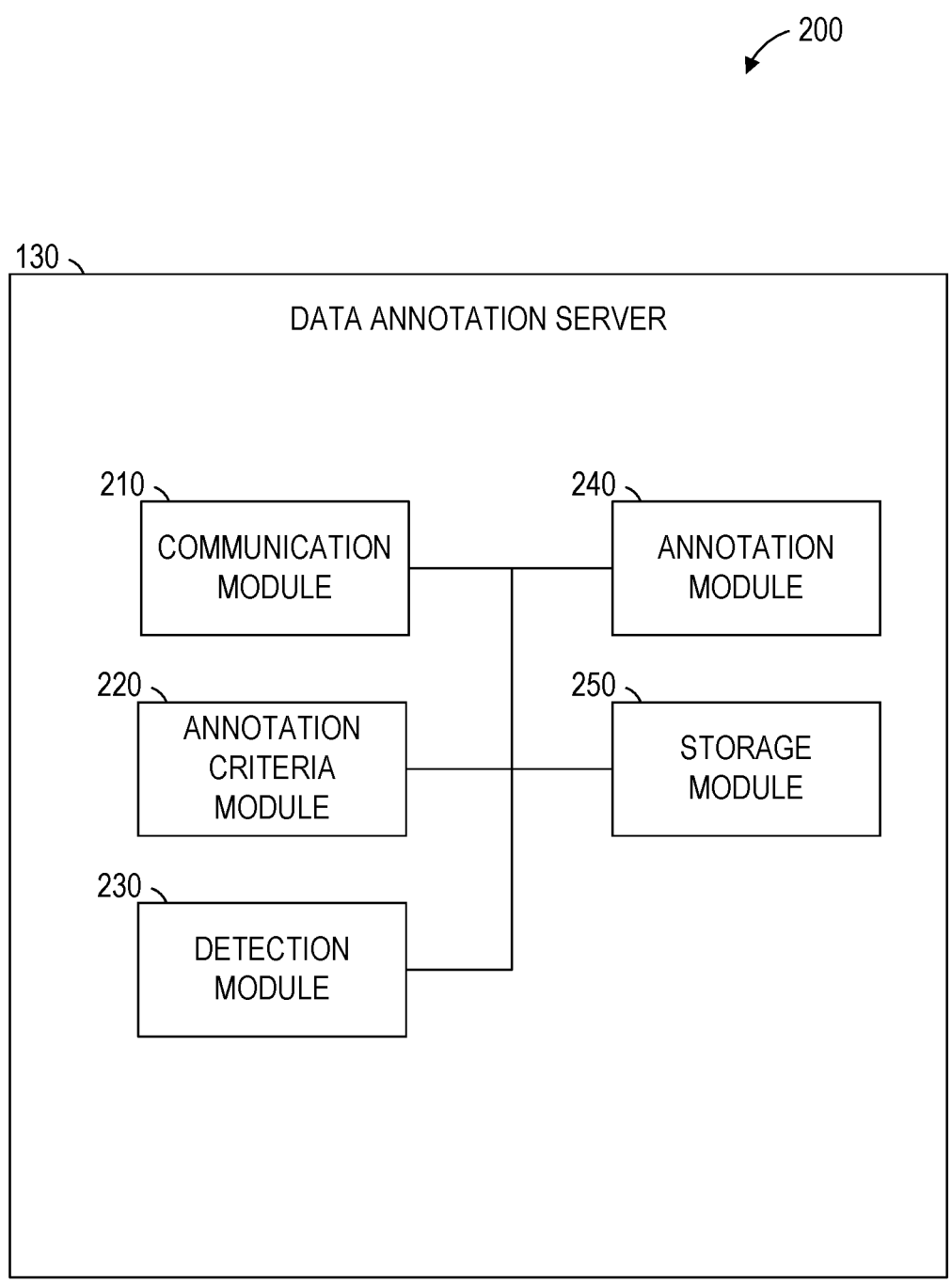
FIG. 2 is a block diagram of a data labeling server, according to some example embodiments, suitable for data generation and annotation for machine learning.

FIG. 2 is a block diagram 200 of the data annotation server 130, according to some example embodiments, suitable for data generation and labeling for machine learning. The data annotation server 130 is shown as including a communication module 210, an annotation criteria module 220, a detection module 230, an annotation module 240, and a storage module 250, all configured to communicate with each other (e.g., via a bus, shared memory, or a switch). Any one or more of the modules described herein may be implemented using hardware (e.g., a processor of a machine). For example, any module described herein may be implemented by a processor configured to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 receives data sent to the data annotation server 130 and transmits data from the data annotation server 130. For example, the communication module 210 receives, from the machine learning server 140, a request for annotated data; receives, from the application server 120, web pages; sends, to the machine learning server 140, annotated data; or any suitable combination thereof.

The annotation criteria module 220 receives criteria from the machine learning server 140 to use during annotation. The criteria may identify which user interfaces should be annotated, which user interface elements the annotation applies to, or both.

Using the criteria of the annotation criteria module 220, the detection module 230 determines whether a web page received from the application server 120 should be annotated. For example, if all web pages for a particular application are to be annotated, the detection module 230 determines if a particular web page is for the particular application or not. As another example, if all web pages containing a particular user interface element are to be annotated, the detection module 230 determines if a particular web page includes the particular user interface element.

The annotation module 240 generates annotation for a web page received from the application server 120. For example, the annotation module 240 may render the web page and store the rendered web page as an image (e.g., a graphics interchange format (GIF) image, a joint photographic experts group (JPEG) image, a portable graphics format (PNG) image, a portable document format (PDF) image, a tagged image file format (TIFF) image, or any suitable combination thereof). Based on the source code of the web page (e.g., by traversing a document object model (DOM) generated from the source code). The annotation module 240 identifies whether a user interface element identified in a request from the machine learning server 140 is present in the user interface, the location of the user interface element in the generated image (e.g., measured in pixels from the upper left corner of the image), the size of the user interface element in the generated image (e.g., measured in pixels wide and high), or any suitable combination thereof.

The communication module 210 transmits one or more images and corresponding annotation generated by the annotation module 240 to the machine learning server 140. In some example embodiments, annotated images are sent as they are generated (e.g., one at a time). In other example embodiments, annotated images are sent in batches of a predetermined size (e.g., five hundred images at a time).

Figure 3:
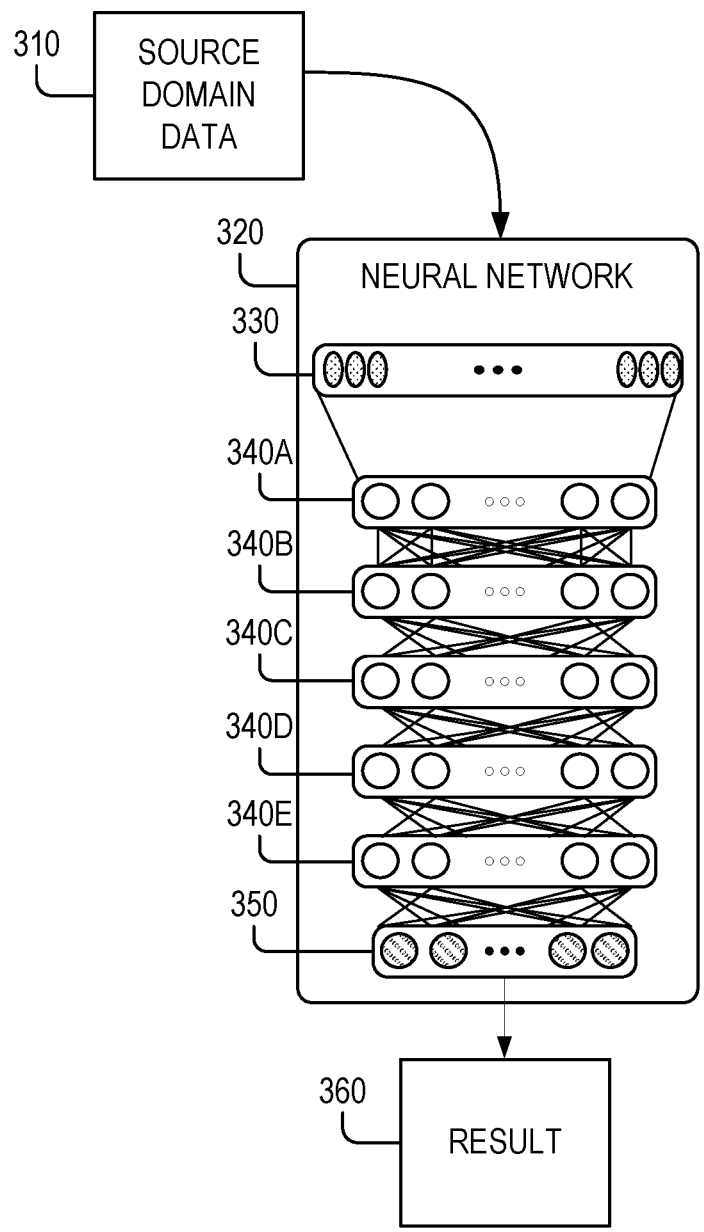
FIG. 3 illustrates the structure of a neural network, according to some example embodiments.

FIG. 3 illustrates the structure of a neural network 320, according to some example embodiments. The neural network 320 takes source domain data 310 as input, processes the source domain data 310 using the input layer 330; the intermediate, hidden layers 340A, 340B, 340C, 340D, and 340E; and the output layer 350 to generate a result 360.

Each of the layers 330-350 comprises one or more nodes (or "neurons"). The nodes of the neural network 320 are shown as circles or ovals in FIG. 3. Each node takes one or more input values, processes the input values using zero or more internal variables, and generates one or more output values. The inputs to the input layer 330 are values from the source domain data 310. The output of the output layer 340 is the result 360. The intermediate layers 340A-340E are referred to as "hidden" because they do not interact directly with either the input or the output, and are completely internal to the neural network 320. Though five hidden layers are shown in FIG. 3, more or fewer hidden layers may be used.

A model may be run against a training dataset for several epochs (e.g., iterations), in which the training dataset is repeatedly fed into the model to refine its results. For example, in a supervised learning phase, a model is developed to predict the output for a given set of inputs, and is evaluated over several epochs to more reliably provide the output that is specified as corresponding to the given input for the greatest number of inputs for the training dataset. In another example, for an unsupervised learning phase, a model is developed to cluster the dataset into n groups, and is evaluated over several epochs as to how consistently it places a given input into a given group and how reliably it produces the n desired clusters across each epoch.

Once an epoch is run, the model is evaluated and the values of its variables are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine learning technique used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several other machine learning algorithms that may be applied with the present disclosure, including linear regression, random forests, decision tree learning, neural networks, deep neural networks, etc.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the nth epoch, the learning phase may end early and use the produced model satisfying the end-goal accuracy threshold. Similarly, if a given model is inaccurate enough to satisfy a random chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number/computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data that it has not been trained on. In a second example, a false positive rate or false negative rate may be used to evaluate the models after finalization. In a third example, a delineation between data clusterings is used to select a model that produces the clearest bounds for its clusters of data.

The neural network 320 may be a deep learning neural network, a deep convolutional neural network, a recurrent neural network, or another type of neural network. A neuron is an architectural element used in data processing and artificial intelligence, particularly machine learning, that includes memory that may determine when to "remember" and when to "forget" values held in that memory based on the weights of inputs provided to the given neuron. An example type of neuron in the neural network 320 is a Long Short Term Memory (LSTM) node. Each of the neurons used herein are configured to accept a predefined number of inputs from other neurons in the network to provide relational and sub-relational outputs for the content of the frames being analyzed. Individual neurons may be chained together and/or organized into tree structures in various configurations of neural networks to provide interactions and relationship learning modeling for how each of the frames in an utterance are related to one another.

For example, an LSTM serving as a neuron includes several gates to handle input vectors (e.g., time-series data), a memory cell, and an output vector. The input gate and output gate control the information flowing into and out of the memory cell, respectively, whereas forget gates optionally remove information from the memory cell based on the inputs from linked cells earlier in the neural network. Weights and bias vectors for the various gates are adjusted over the course of a training phase, and once the training phase is complete, those weights and biases are finalized for normal operation. One of skill in the art will appreciate that neurons and neural networks may be constructed programmatically (e.g., via software instructions) or via specialized hardware linking each neuron to form the neural network.

A neural network, sometimes referred to as an artificial neural network, is a computing system based on consideration of biological neural networks of animal brains. Such systems progressively improve performance, which is referred to as learning, to perform tasks, typically without task-specific programming. For example, in image recognition, a neural network may be taught to identify images that contain an object by analyzing example images that have been tagged with a name for the object and, having learnt the object and name, may use the analytic results to identify the object in untagged images. A neural network is based on a collection of connected units called neurons, where each connection, called a synapse, between neurons can transmit a unidirectional signal with an activating strength that varies with the strength of the connection. The receiving neuron can activate and propagate a signal to downstream neurons connected to it, typically based on whether the combined incoming signals, which are from potentially many transmitting neurons, are of sufficient strength, where strength is a parameter.

A deep neural network (DNN) is a stacked neural network, which is composed of multiple layers. The layers are composed of nodes, which are locations where computation occurs, loosely patterned on a neuron in the human brain, which fires when it encounters sufficient stimuli. A node combines input from the data with a set of coefficients, or weights, that either amplify or dampen that input, which assigns significance to inputs for the task the algorithm is trying to learn. These input-weight products are summed, and the sum is passed through what is called a node's activation function, to determine whether and to what extent that signal progresses further through the network to affect the ultimate outcome. A DNN uses a cascade of many layers of non-linear processing units for feature extraction and transformation. Each successive layer uses the output from the previous layer as input. Higher-level features are derived from lower-level features to form a hierarchical representation. The layers following the input layer may be convolution layers that produce feature maps that are filtering results of the inputs and are used by the next convolution layer.

In training of a DNN architecture, a regression, which is structured as a set of statistical processes for estimating the relationships among variables, can include a minimization of a cost function. The cost function may be implemented as a function to return a number representing how well the neural network performed in mapping training examples to correct output. In training, if the cost function value is not within a pre-determined range, based on the known training images, backpropagation is used, where backpropagation is a common method of training artificial neural networks that are used with an optimization method such as a stochastic gradient descent (SGD) method.

Use of backpropagation can include propagation and weight update. When an input is presented to the neural network, it is propagated forward through the neural network, layer by layer, until it reaches the output layer. The output of the neural network is then compared to the desired output, using the cost function, and an error value is calculated for each of the nodes in the output layer. The error values are propagated backwards, starting from the output, until each node has an associated error value which roughly represents its contribution to the original output. Backpropagation can use these error values to calculate the gradient of the cost function with respect to the weights in the neural network. The calculated gradient is fed to the selected optimization method to update the weights to attempt to minimize the cost function.

In some example embodiments, the structure of each layer is predefined. For example, a convolution layer may contain small convolution kernels and their respective convolution parameters, and a summation layer may calculate the sum, or the weighted sum, of two or more values. Training assists in defining the weight coefficients for the summation.

One way to improve the performance of DNNs is to identify newer structures for the feature-extraction layers, and another way is by improving the way the parameters are identified at the different layers for accomplishing a desired task. For a given neural network, there may be millions of parameters to be optimized. Trying to optimize all these parameters from scratch may take hours, days, or even weeks, depending on the amount of computing resources available and the amount of data in the training set.

FIG. 4 is a block diagram of a database schema 400 storing requests and annotations, according to some example embodiments, suitable for use in data generation and labeling for machine learning. The database schema 400 includes a request table 410 and an annotation table 440. The request table 410 includes rows 430A, 430B, and 430C of a format 420. The annotation table 440 includes rows 460A, 460B, and 460B of a format 450.

The data annotation server 130 stores data for requests received from the machine learning server 140 in the request table 410. The format 420 of the request table 410 includes a request identifier field, an element identifier field, and a size field. Each request identifies a user interface element to be detected and annotated. The request may include data that indicates a number of annotated images that are requested, stored in the size field of the request table 410. The relationship between the identifier for the request and the user interface element is indicated by a row for the request. For example, the row 430A indicates that the request with identifier 123 is a request to annotate 500 images of user interfaces that include a search button. The row 430B indicates that the request with identifier 234 is a request to annotate 1,000 images of user interfaces that include a text field for a search. The row 430C indicates that the request with identifier 456 is a request to annotate 5,000 images of user interfaces that include a radio button.

In some example embodiments, the element identifier includes a label to be used for the annotation and search criteria to be used to determine if a particular element is being searched for. Thus, the row 430A indicates that inputs of type "search" should be annotated and labeled with "SearchButton." The row 430B indicates that inputs of type "search" should be annotated and labeled with "TextField." The row 430C indicates that inputs of type "submit" that contain no text should be annotated and labeled with "ClickButton." The element identifier may be a string defined according to XPath, eXtended Markup Language (XML) Path Language. An xpath uses a path notation for navigating through the hierarchical structure of an XML document or a JavaScript Object Notation (JSON) tree.

The element identifier may comprise an identifier of a type of the user interface element. For example, the rows 430A and 430B include the identifier "TYPE='SEARCH'," identifying the user interface element to be annotated as a user interface element of the type "search." As another example, the row 430C includes the identifier "TYPE='SUBMIT'," identifying the user interface element to be annotated as a user interface element of the type "submit." The user interface element types may be built-in types such as text box, drop-down menu, combo box, button, and the like, or user- or application-defined types. For example, "submit" may be a custom type of the built-in button type.

The annotation table 440 includes one row for each annotated image. Each row includes the identifier of the request for which the image is annotated, a file name of the image, and annotations for the image. In the example of FIG. 4, the format 450 specifies that the annotation for each image is a name of the user interface element specified in the request and a bounding box that contains the user interface element. Thus, the row 460A indicates that a SearchButton (as specified in the request with identifier 123) has a bounding box of (46, 0, 94, 46). The row 460B indicates that a TextField has a bounding box of (1738, 0, 1786, 46). The row 460C indicates that a ClickButton has a bounding box of (188, 235, 218, 273). In the event that a detected bounding box extends past the edge of the image (e.g., with a negative value or with a value that exceeds the image width or height), the bounding box is clipped to the edge of the image. For example, if the y-coordinate of the upper-left corner of the bounding box of the row 460A were initially determined to be −2, the value would be clipped to the image and set to 0.

In some example embodiments, a bounding box is defined by an upper-left corner, a width, and a height. In other example embodiments, a bounding box is defined by an upper-left corner and a lower-right corner. Each image file may be placed in a directory corresponding to the request (e.g., data/123, data/234, and data/456 as shown in the example of FIG. 4).

Figure 5:
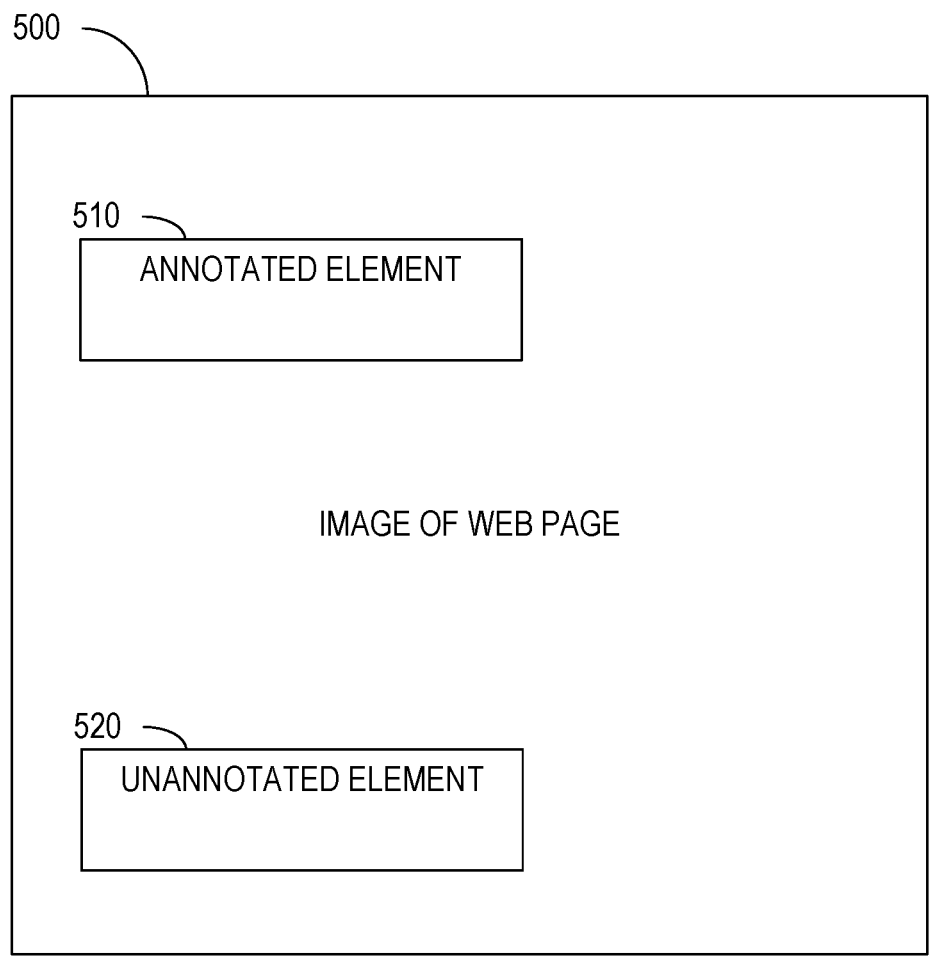
FIG. 5 is a block diagram of an annotated image, according to some example embodiments, suitable for use in data generation and annotation for machine learning.

FIG. 5 is a block diagram of an annotated image 500, according to some example embodiments, suitable for use in data generation and annotation for machine learning. The annotated image 500 includes an annotated element 510 and an unannotated element 520. Though the annotated image 500 includes one annotated element 510 and one unannotated element 520, annotated images in general may include any number of unannotated elements and any number of annotated elements. The annotated element 510 is an element that matches the criteria specified by a search. The unannotated element 520 is an element that does not match the criteria specified by the search.

In some example embodiments, the annotated image 500 is presented in a user interface generated by the machine learning server 140. The user interface may allow the user to select one or more annotated elements (e.g., using an XML browser to browse an annotation file) and highlight the selected elements on the annotated image 500. Thus, a user of the machine learning server 140 is enabled to easily validate the annotation provided by the data annotation server 130. In some example embodiments, annotated images are used for training an ML model only after approval by a human reviewer. Accordingly, the user interface presented to the reviewer may include options to modify the computer-generated annotation, to discard the annotated image from the training set, or both.

Figure 6:
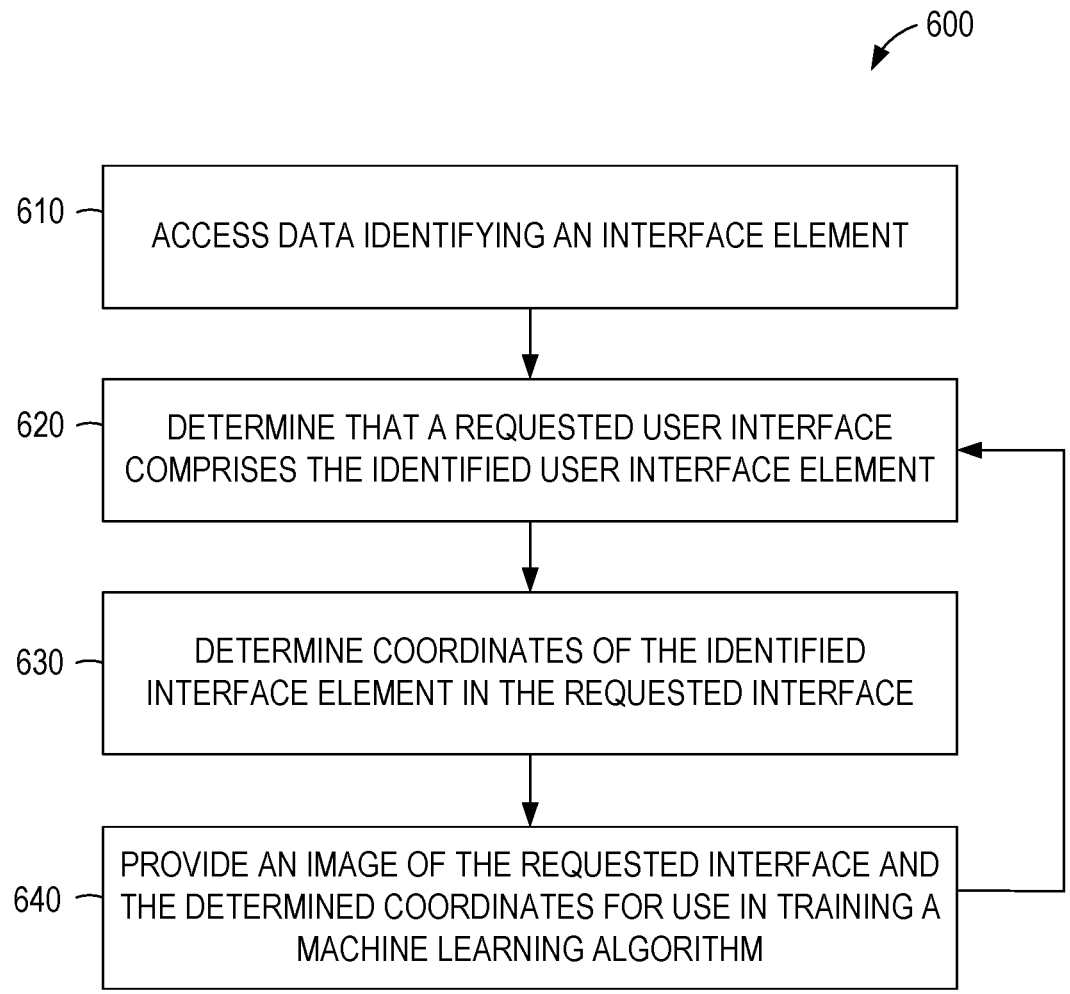
FIG. 6 is a flowchart illustrating operations of a method suitable for data generation and annotation for machine learning, according to some example embodiments.

FIG. 6 is a flowchart illustrating operations of a method 600 suitable for data generation and annotation for machine learning, according to some example embodiments. The method 600 includes operations 610, 620, 630, and 640. By way of example and not limitation, the method 600 is described as being performed in the network environment 100 of FIG. 1 by the data annotation server 130 described in FIG. 2 using the database schema 400 of FIG. 4.

In operation 610, the annotation criteria module 220 of the data annotation server 130 accesses data identifying an interface element. For example, operation 610 may comprise receiving a request from the machine learning server 140. As another example, operation 610 may comprise accessing one of the rows 430A-430C of the request table 410. In this example, operations of receiving the request and storing the data identifying the user interface element in the database may be performed before operation 610.

Though the method 600 is described as accessing data identifying a single user interface element and providing annotation for the single user interface element, the accessed data (e.g., the request from the machine learning server 140) may identify multiple user interface elements, each of which will be annotated if present.

The detection module 230 of the data annotation server 130, in operation 620, determines that a requested interface comprises the identified user interface element. For example, the client device 150 requests a user interface from the application server 120. The detection module 230 determines if the responsive user interface generated by the application server 120 includes the user interface element specified by the request. For example, a pattern matching tool (e.g., Unix commands grep, sed, and awk; scripts written in scripting languages such as Python and Perl; commercial regular expression tools; customized compiled applications; or any suitable combination thereof) may be used to determine if one or more files provided by the application server 120 for the user interface match the data identifying the user interface element. Based on the determination that the requested user interface element comprises the identified user interface element, the method 600 proceeds to operation 630. Detection of the user interface element may include determining an identifier (e.g., a numeric identifier or an alphanumeric identifier) of the user interface element.

In some example embodiments, instead of accessing requests from other devices for user interface elements that include the identified user interface element, the data annotation server 130 requests user interfaces on behalf of the machine learning server 140. For example, the request may include a username and password of an account on the application server 120. Using the username and password, the data annotation server 130 requests user interfaces and processes them. By accessing source code for the various user interfaces of the application server, the data annotation server 130 determines which user interfaces to request, ensuring that only user interfaces that include the user interface element identified in operation 610 are requested.

In operation 630, the annotation module 240 of the data annotation server 130 determines coordinates of the identified interface element in the requested interface. For example, a rendering engine (e.g., WebKit™, Blink™, EdgeHTML™, Gecko™, Servo™, Goanna™, NetSurf™, KHTML™, Trident™, or Presto™) may render an image of the user interface based on one or more files provided by the application server 120. Through programmatic access to the rendering engine, coordinates for the user interface are determined. For example, once the DOM object corresponding to the identified user interface element is determined, the getBoundingClientRect( ) JavaScript function can be used to retrieve the bounding box. If the identifier for the DOM object is known (e.g., as determined during detection of the user interface element), the DOM object may be retrieved using the getElementById( ) JavaScript function. Alternatively, a list of matching DOM objects can be retrieved using the querySelectorAll( ) JavaScript function and iterated over to determine which DOM object corresponds to the identified user interface element.

The annotation may include text associated with the identified user interface element. The text may be obtained programmatically (e.g., using methods of a DOM object for the user interface element) or using optical character recognition (OCR). For example, based on the coordinates, OCR may be performed on a portion of the image containing the identified user interface element to obtain text associated with the identified user interface element.

The identified user interface element may be present multiple times in the user interface. In this event, each instance of the identified user interface element is annotated. For example, if the request is to annotate text boxes and the user interface contains six text boxes, the annotation for the image includes the coordinates (e.g., bounding boxes) of all six text boxes.

The annotation module 240 provides, in operation 640, an image of the requested interface and the determined coordinates to the machine learning server 140, for use in training a machine learning algorithm. For example, the image and the coordinates of the identified user interface element in the image may be sent as part of a batch of image/coordinate pairs. The batch may be sent in response to a request from the machine learning server 140, in response to a determination that a predetermined batch size of annotated images is ready to be sent, or any suitable combination thereof.

Operations 620, 630, and 640 may be repeated until a requested number of images are annotated. For example, the request for images may indicate a number of requested images (e.g., 100, 500, 1000, 5000, 10000, or any other number). The request for images may indicate a requested batch size. Alternatively, a default batch size (e.g., 500 images) may be used. Operations 620 and 630 may be performed for different user interfaces in parallel. Though operations 620, 630, and 640 are shown as being performed once each before the method 600 returns to operation 620, the operation of providing the images and coordinates may be performed once for a number of images in a batch.

A portion of an example annotation file is presented below. The "annotation" tag contains the annotation data. Within the annotation tag, folder, filename, path, source, size, and object tags provide specific information. The folder tag identifies the folder in which the annotated image is stored. The filename tag identifies the file, within the folder, that is annotated. The path tag indicates the full path to the annotated file. The source tag identifies the source of the annotated image, and may contain a value corresponding to the data annotation server 130. The size tag identifies the size of the annotated image (e.g., width, height, and depth). The depth of an image is the number of bits per pixel. Each object tag contains annotation data for an annotated object in the image.

```
<?xml version="1.0"?>
<annotation>
    <folder>20190328-104631</folder>
    <filename>Data/20190328-104631/3.png</filename>
    <path>C:\Users\ABCD\MyWork\Data\D2019328-
    104631\3.png</path>
    <source>
        <database>Unknown</database>
    </source>
    <size>
        <width>1920</width>
        <height>937</height>
        <depth>3</depth>
    </size>
    <object>
        ...
    </object>
</annotation>
```

According to the example above, the annotated image is 3.png, located in the folder 20190328-104631, with a full path of C:\Users\ABCD\MyWork\Data\D2019328-104631\3.png. The image is 1920 pixels by 937 pixels, and uses 3 bits per pixel (8 colors). An additional portion of the example annotation file is shown below. Within each object tag, the name and bndbox tags identify the name of the annotated object and the bounding box of the object in the annotated image.

```
<object>
    <name>UserButton</name>
    <bndbox>
        <xmin>48</xmin>
        <ymin>0</ymin>
        <xmax>92</xmax>
        <ymax>44</ymax>
    </bndbox>
<object>
<object>
    <name>HomeButton</name>
    <bndbox>
        <xmin>136</xmin>
        <ymin>0</ymin>
        <xmax>180</xmax>
        <ymax>44</ymax>
    </bndbox>
</object>
```

The object annotations above are for a UserButton and a HomeButton. The UserButton has upper-left-corner coordinates of (48, 0) and lower-right-corner coordinates of (92, 44). The HomeButton has upper-left-corner coordinates of (136, 0) and lower-right-corner coordinates of (180, 440). In this example, the requested annotation may have been for all buttons, resulting in both matching user interface elements being annotated. Alternatively, the requested annotation may have identified UserButton and HomeButton separately, also resulting in the two user interface elements being annotated.

Figure 7:
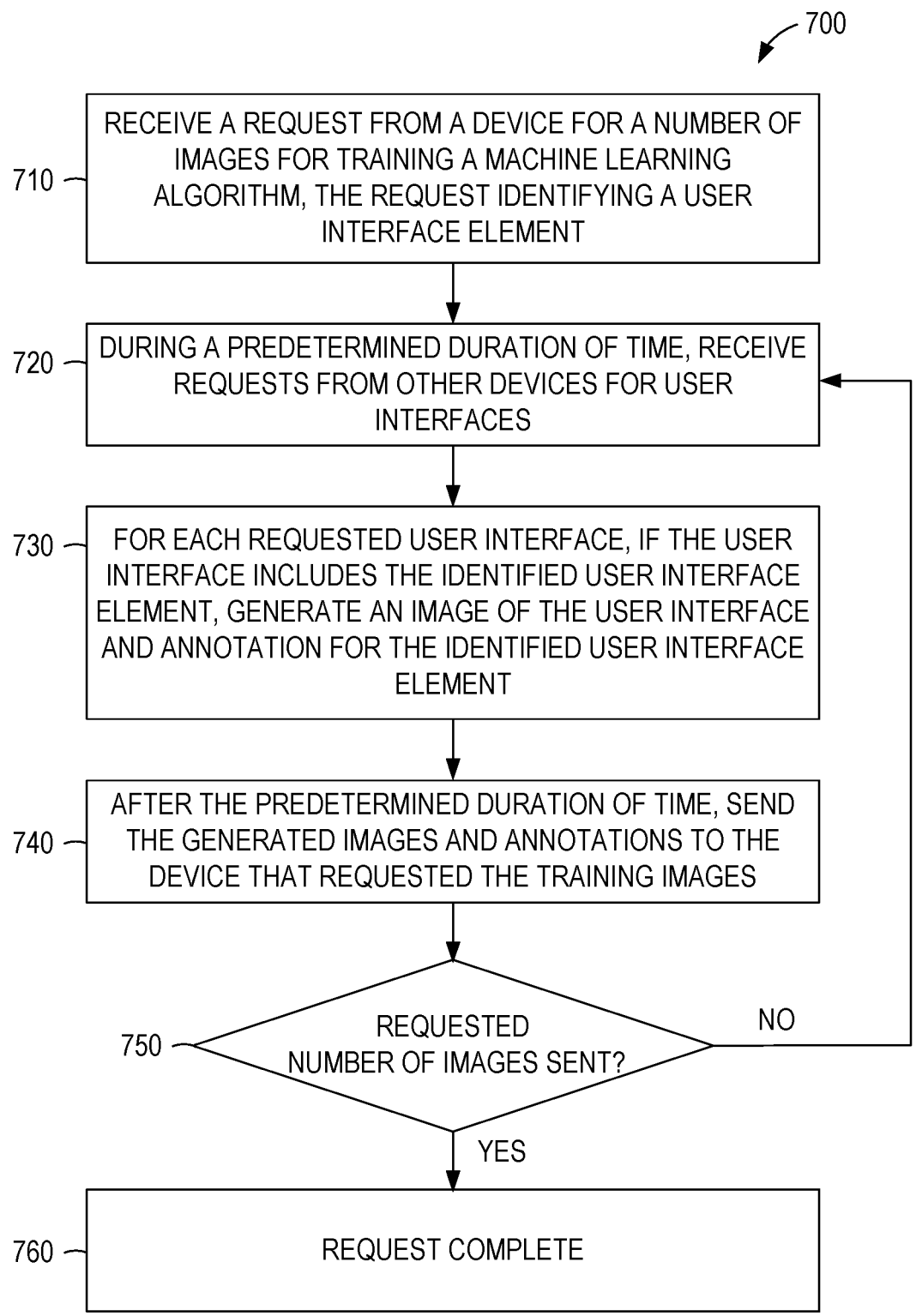
FIG. 7 is a flowchart illustrating operations of a method suitable for data generation and annotation for machine learning, according to some example embodiments.

FIG. 7 is a flowchart illustrating operations of a method 700 suitable for data generation and annotation for machine learning, according to some example embodiments. The method 700 includes operations 710, 720, 730, 740, 750, and 760. By way of example and not limitation, the method 700 is described as being performed in the network environment 100 of FIG. 1 by the application server 120 and the annotation server 130 described in FIG. 2 using the database schema 400 of FIG. 4. The method 700 is an alternative to the method 600.

In operation 710, the annotation criteria module 220 of the annotation server 130 receives a request from a device (e.g., the machine learning server 140) for a number of images for training a machine learning algorithm, the request identifying a user interface element. For example, a request for 5000 images of user interfaces that include inputs of type search (as shown in the row 430A of the request table 410) may be received. Receiving the request may comprise accessing data (e.g., a parameter included in the request) that indicates a number of requested images.

The application server 120, during a predetermined duration of time (e.g., during a five-minute period of time) receives requests from other devices (e.g., the client device 150) for user interfaces (operation 720). For each requested user interface, in operation 730, the detection module 230 of the annotation server 130 determines if the requested user interface includes the identified user interface element and, if so, the annotation module 240 generates an image of the user interface and annotation for the identified user interface element. For example, the annotation server 130 may receive a copy of a set of instructions for each user interface being sent from the application server 120 to the client device 150, the set of instructions to be executed by the client device 150 to display the user interface. By searching the set of instructions for an instruction to create a user interface element matching the user interface element identified during operation 710, the annotation server 130 determines whether the user interface includes the identified user interface element.

If the user interface includes the identified user interface element, the set of instructions are executed by the annotation server 130 to generate an image of the user interface. Additionally, in some example embodiments, the DOM of the user interface is traversed and annotation (e.g., coordinates, a bounding box, a label, or any suitable combination thereof) for the user interface element is generated. The annotation may be stored in the annotation table 440 of FIG. 4.

In some example embodiments, additional images are generated and annotated based on the image of the requested user interface. For example, the image may be copied and modified to generate an additional image. In one example, the generated image is flipped around the vertical axis to create a mirror image. As other examples, a portion of the image (e.g., a quadrant of the image) may be enlarged to a standard image size; the image may be reduced in size and padded with pixels of a background color (e.g., white) to the standard size; the image may be panned left, right, up, or down, losing some information on one side and adding background pixels on the opposite side; or any suitable combination thereof. In each case, the annotation undergoes the same transformation as the image. In this manner, the set of annotated images for use in machine learning is increased.

In operation 740, after the predetermined duration of time, the communication module 210 of the annotation server 130 sends the generated images and annotations to the device that requested the training images. For example, if one hundred requests for user interfaces were received during the predetermined period of time in operation 720 and, of those, twenty user interfaces were found to include the user interface element and annotated in operation 730, the twenty images and their corresponding annotation are sent to the machine learning server 140 (e.g., as a batch) in operation 740. The annotations for each image may be included in a separate XML file, such that the number of XML annotation files and the number of image files is the same. The prefix of the XML file and its corresponding image file may be the same, with different suffixes. For example, 1.XML may be the annotation file for the 1.PNG image file.

Alternatively, the annotations for each image may be included in a single XML file for each batch, with a separate element in the XML file for each annotated image. The XML files may be Pattern Analysis, Statistical Modelling and Computational Learning (PASCAL) Visual Object Classes (VOC) files. In some example embodiments, the images and their annotations are deleted from the storage of the annotation server 130 after being sent. In other example embodiments, the images and their annotations remain available on the annotation server 130 and can be provided again in response to a further request.

The annotation server 130 checks, in operation 750, whether the total number of images sent so far is at least equal to the number of images requested in operation 710. If not, processing returns to operation 720, allowing more images to be annotated and sent. If the total number of images sent is at least equal to the number of images requested, processing continues to operation 760, and the request is complete.

Thus, in some example embodiments, the determining of annotation (e.g., coordinates of the identified user interface element) for each user interface element in operation 730 is part of determining annotation for the identified user interface element in the requested number of user interfaces. Similarly, in these example embodiments, the providing of the batches of user interface elements and annotation in operation 740 is part of providing the requested number of user interface images and, for each provided image, determined annotation for the identified user interface element.

By use of the method 700, the requesting machine learning server 140 begins to receive annotated images after the relatively short duration of time used in operation 720 (e.g., thirty minutes) and eventually receives a relatively large number of requested annotated images (e.g., 10,000). Compared to systems in which all images are annotated before being provided, the delay before training an ML model by the ML server 140 is reduced.

EXAMPLES

Example 1 is a method comprising: accessing, by one or more processors, data identifying an interface element; determining, by the one or more processors, coordinates of the identified interface element in a requested interface; and providing an image of the requested interface and the determined coordinates for use in training a machine learning algorithm.

In Example 2, the subject matter of Example 1 includes, accessing data indicating a number of requested images; wherein: the determining of the coordinates of the identified interface element in the requested interface is part of determining coordinates of the identified interface element in the number of requested images; and the providing of the image of the requested interface and the determined coordinates for use in training the machine learning algorithm is part of providing the number of requested images and, for each provided image, determined coordinates of the identified interface element.

In Example 3, the subject matter of Examples 1-2 includes, based on the coordinates, performing optical character recognition (OCR) on a portion of the image containing the identified interface element.

In Example 4, the subject matter of Examples 1-3 includes, wherein: the determining of the coordinates of the identified interface element in the requested interface comprises determining the coordinates using JavaScript to extract data from a Document Object Model (DOM) of the requested interface.

In Example 5, the subject matter of Examples 1-4 includes, wherein: the providing of the determined coordinates comprises providing a bounding box of the identified interface element.

In Example 6, the subject matter of Examples 1-5 includes, wherein: the accessing of the data identifying the interface element comprises accessing an identifier of a type of the interface element.

In Example 7, the subject matter of Examples 1-6 includes, wherein: the accessing of the data identifying the interface element comprises accessing an xpath.

Example 8 is a system comprising: a memory that stores instructions; and one or more processors configured by the instructions to perform operations comprising: accessing data identifying an interface element; determining coordinates of the identified interface element in a requested interface; and providing an image of the requested interface and the determined coordinates for use in training a machine learning algorithm.

In Example 9, the subject matter of Example 8 includes, wherein: the operations further comprise accessing data indicating a number of requested images; the determining of the coordinates of the identified interface element in the requested interface is part of determining coordinates of the identified interface element in the number of requested images; and the providing of the image of the requested interface and the determined coordinates for use in training the machine learning algorithm is part of providing the number of requested images and, for each provided image, determined coordinates of the identified interface element.

In Example 10, the subject matter of Examples 8-9 includes, wherein the operations further comprise: based on the coordinates, performing optical character recognition (OCR) on a portion of the image containing the identified interface element.

In Example 11, the subject matter of Examples 8-10 includes, wherein: the providing of the determined coordinates comprises providing a bounding box of the identified interface element.

In Example 12, the subject matter of Examples 8-11 includes, wherein the determining of the coordinates of the identified interface element in the requested interface comprises traversing a Document Object Model (DOM) of the requested interface.

In Example 13, the subject matter of Examples 8-12 includes, wherein: the determined coordinates are provided in an eXtended Markup Language (XML) file.

In Example 14, the subject matter of Example 13 includes, wherein: a prefix of the XML file is the same as a prefix of a file containing the provided image.

Example 15 is a non-transitory machine-readable medium that stores instructions that, when executed by one or more processors, cause the one or more processors to perform operations comprising: accessing data identifying an interface element; accessing data indicating a number of requested images; determining coordinates of the identified interface element in the number of requested images; and providing the number of requested images and, for each provided image, determined coordinates of the identified interface element for use in training a machine learning algorithm.

In Example 16, the subject matter of Example 15 includes, wherein the determining of the coordinates of the identified interface element in the requested interface comprises traversing a Document Object Model (DOM) of the requested interface.

In Example 17, the subject matter of Examples 15-16 includes, wherein: the determined coordinates are provided in an eXtended Markup Language (XML) file.

In Example 18, the subject matter of Example 17 includes, wherein: a prefix of the XML file is the same as a prefix of a file containing the provided image.

In Example 19, the subject matter of Examples 15-18 includes, wherein the operations further comprise: training the machine learning algorithm using the provided images and determined coordinates.

In Example 20, the subject matter of Examples 15-19 includes, wherein the operations further comprise: generating a portion of the requested images by modifying copies of images of requested interfaces.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Figure 8:
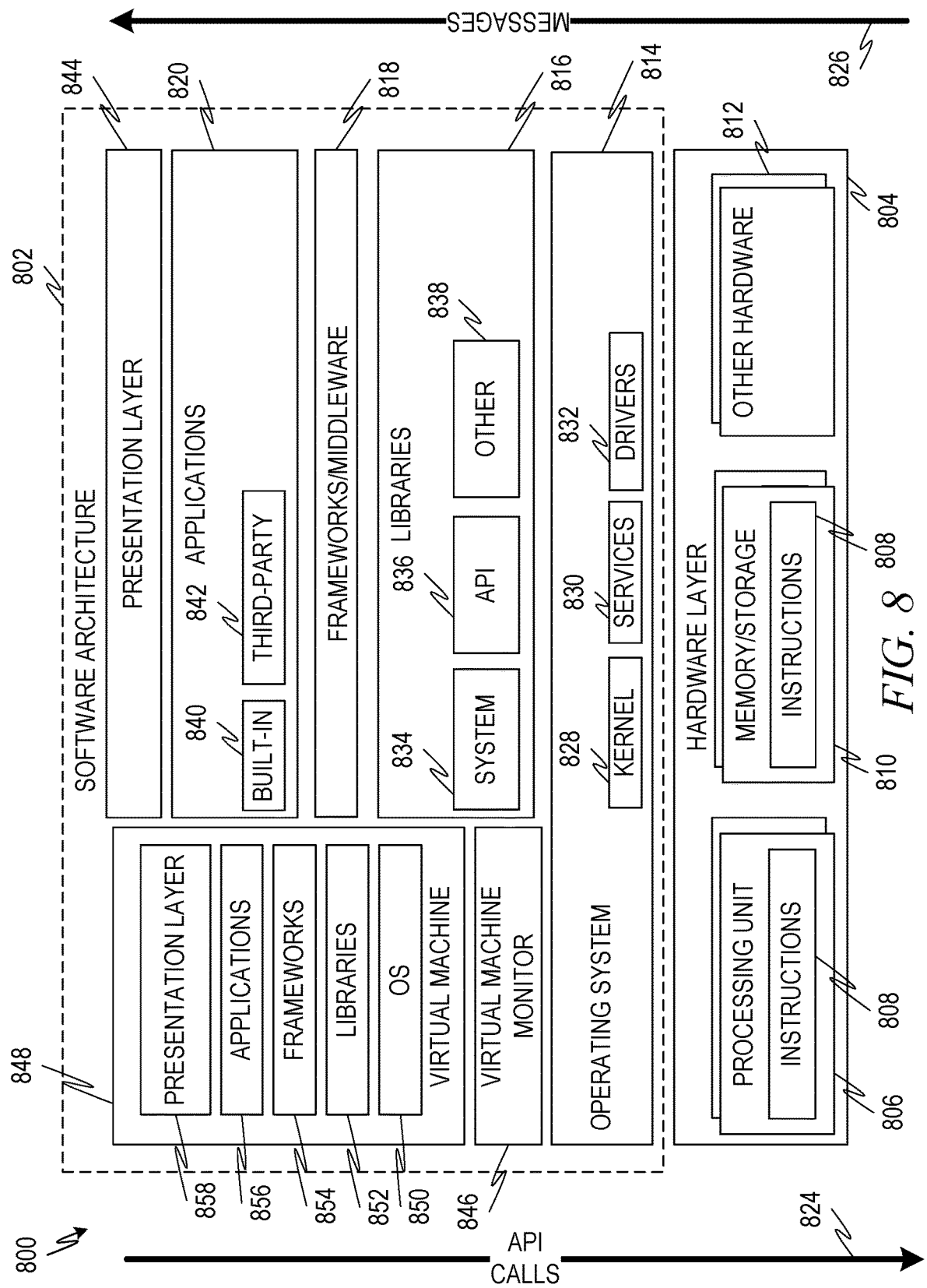
FIG. 8 is a block diagram showing one example of a software architecture for a computing device.

FIG. 8 is a block diagram 800 showing one example of a software architecture 802 for a computing device. The architecture 802 may be used in conjunction with various hardware architectures, for example, as described herein. FIG. 8 is merely a non-limiting example of a software architecture and many other architectures may be implemented to facilitate the functionality described herein. A representative hardware layer 804 is illustrated and can represent, for example, any of the above referenced computing devices. In some examples, the hardware layer 804 may be implemented according to the architecture of the computer system of FIG. 8.

The representative hardware layer 804 comprises one or more processing units 806 having associated executable instructions 808. Executable instructions 808 represent the executable instructions of the software architecture 802, including implementation of the methods, modules, subsystems, and components, and so forth described herein and may also include memory and/or storage modules 810, which also have executable instructions 808. Hardware layer 804 may also comprise other hardware as indicated by other hardware 812 which represents any other hardware of the hardware layer 804, such as the other hardware illustrated as part of the software architecture 802.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820 and presentation layer 844. Operationally, the applications 820 and/or other components within the layers may invoke application programming interface (API) calls 824 through the software stack and access a response, returned values, and so forth illustrated as messages 826 in response to the API calls 824. The layers illustrated are representative in nature and not all software architectures have all layers. For example, some mobile or special purpose operating systems may not provide a frameworks/middleware layer 818, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of an interrupt and, in response, cause the architecture 802 to pause its current processing and execute an interrupt service routine (ISR) when an interrupt is accessed.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 816 may provide a common infrastructure that may be utilized by the applications 820 and/or other components and/or layers. The libraries 816 typically provide functionality that allows other software modules to perform tasks in an easier fashion than to interface directly with the underlying operating system 814 functionality (e.g., kernel 828, services 830 and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be utilized by the applications 820 and/or other software components/modules. For example, the frameworks 818 may provide various graphic user interface (GUI) functions, high-level resource management, high-level location services, and so forth. The frameworks 818 may provide a broad spectrum of other APIs that may be utilized by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. Third-party applications 842 may include any of the built in applications as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third-party application 842 may invoke the API calls 824 provided by the mobile operating system such as operating system 814 to facilitate functionality described herein.

The applications 820 may utilize built-in operating system functions (e.g., kernel 828, services 830 and/or drivers 832), libraries (e.g., system libraries 834, API libraries 836, and other libraries 838), frameworks/middleware 818 to create user interfaces to interact with users of the system. Alternatively, or additionally, in some systems interactions with a user may occur through a presentation layer, such as presentation layer 844. In these systems, the application/module "logic" can be separated from the aspects of the application/module that interact with a user.

Some software architectures utilize virtual machines. In the example of FIG. 8, this is illustrated by virtual machine 848. A virtual machine creates a software environment where applications/modules can execute as if they were executing on a hardware computing device. A virtual machine is hosted by a host operating system (operating system 814) and typically, although not always, has a virtual machine monitor 846, which manages the operation of the virtual machine as well as the interface with the host operating system (i.e., operating system 814). A software architecture executes within the virtual machine 848 such as an operating system 850, libraries 852, frameworks/middleware 854, applications 856 and/or presentation layer 858. These layers of software architecture executing within the virtual machine 848 can be the same as corresponding layers previously described or may be different.

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more hardware processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., APIs).

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Figure 9:
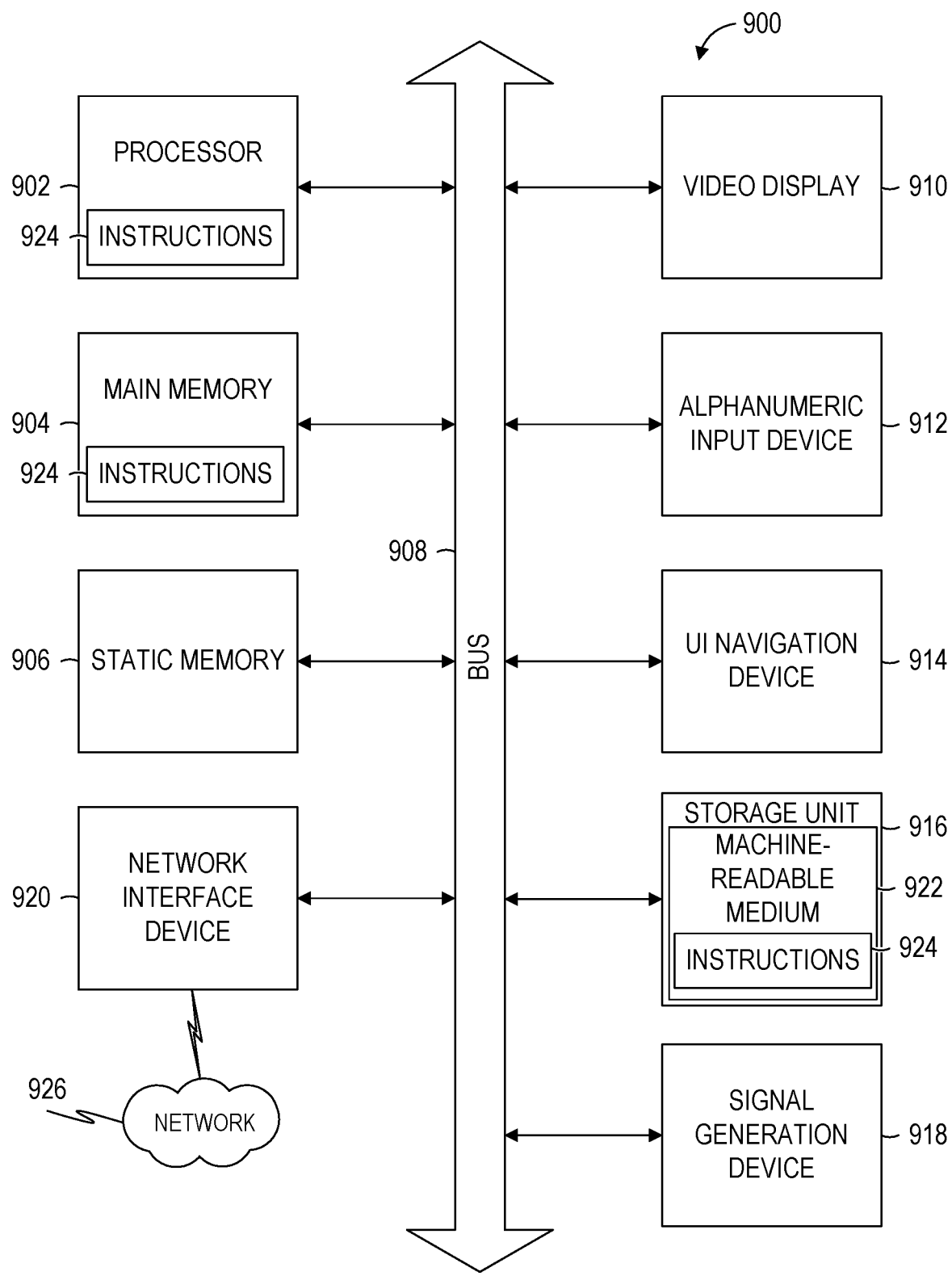
FIG. 9 is a block diagram of a machine in the example form of a computer system within which instructions may be executed for causing the machine to perform any one or more of the methodologies discussed herein.

FIG. 9 is a block diagram of a machine in the example form of a computer system 900 within which instructions 924 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU), or both), a main memory 904, and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard or a touch-sensitive display screen), a user interface (UI) navigation (or cursor control) device 914 (e.g., a mouse), a disk drive unit 916, a signal generation device 918 (e.g., a speaker), and a network interface device 920.

The disk drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, with the main memory 904 and the processor 902 also constituting machine-readable media 922.

While the machine-readable medium 922 is shown in an example embodiment to be a single medium, the term "machine-readable medium" may include a single medium or multiple media (e.g., a centralized or distributed database, and/or associated caches and servers) that store the one or more instructions 924 or data structures. The term "machine-readable medium" shall also be taken to include any tangible medium that is capable of storing, encoding, or carrying instructions 924 for execution by the machine and that cause the machine to perform any one or more of the methodologies of the present disclosure, or that is capable of storing, encoding, or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. A machine-readable medium is not a transmission medium.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 924 for execution by the machine, and includes digital or analog communications signals or other intangible media to facilitate communication of such software.

Although specific example embodiments are described herein, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" and "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, by one or more processors, a request from a device for images for training a machine learning algorithm, the request specifying a user interface element and a number of images;
   during a predetermined duration of time, receiving requests from other devices for user interfaces;
   for each requested user interface, determining whether the requested user interface includes the specified user interface element;
   for each requested user interface that is determined to include the specified user interface element, generating an image of the requested user interface that is determined to include the specified user interface element and annotation for the specified user interface element, the generating of the annotation comprising determining, by the one or more processors, coordinates of the specified user interface element in the requested user interface that is determined to include the specified user interface element; and
   providing the generated images and annotation to the device for use in training the machine learning algorithm.

2. The method of claim 1, wherein the generating of the annotation for the specified user interface element further comprises:

based on the coordinates, performing optical character recognition (OCR) on a portion of the image of the requested user interface that is determined to include the specified user interface element.

3. The method of claim 1, wherein:
the determining of the coordinates of the specified user interface element in the requested user interface that is determined to include the specified user interface element comprises determining the coordinates using JavaScript to extract data from a Document Object Model (DOM) of the requested user interface that is determined to include the specified user interface element.

4. The method of claim 1, wherein:
the providing of the annotation comprises providing a bounding box of the specified user interface element.

5. The method of claim 1, wherein:
the determining that the requested user interface includes the specified user interface element comprises accessing an identifier of a type of the specified user interface element.

6. The method of claim 1, wherein:
the determining that the requested user interface includes the specified user interface element comprises accessing an xpath.

7. A system comprising:
a memory that stores instructions; and
one or more processors configured by the instructions to perform operations comprising:
  receiving a request from a device for images for training a machine learning algorithm, the request specifying a user interface element and a number of images;
  during a predetermined duration of time, receiving requests from other devices for user interfaces;
  for each requested user interface, determining whether the requested user interface includes the specified user interface element;
  for each requested user interface that is determined to include the specified user interface element, generating an image of the requested user interface that is determined to include the specified user interface element and annotation for the specified user interface element, the generating of the annotation comprising determining, by the one or more processors, coordinates of the specified user interface element in the requested user interface that is determined to include the specified user interface element; and
  providing the generated images and annotation to the device for use in training the machine learning algorithm.

8. The system of claim 7, wherein the generating of the annotation for the specified user interface element further comprises:
based on the coordinates, performing optical character recognition (OCR) on a portion of the image of the requested user interface that is determined to include the specified user interface element.

9. The system of claim 7, wherein:
the providing of the annotation comprises providing a bounding box of the specified user interface element.

10. The system of claim 7, wherein the determining of the coordinates of the specified user interface element in the requested user interface that is determined to include the specified user interface element comprises determining the coordinates using JavaScript to extract data from a Document Object Model (DOM) of the requested user interface that is determined to include the specified user interface element.

11. The system of claim 7, wherein:
the determined coordinates for each provided image are provided in an extended Markup Language (XML) file that corresponds to the provided image.

12. The system of claim 11, wherein:
a prefix of the XML file is same as a prefix of a file containing the provided image.

13. The system of claim 7, wherein:
the determining that the requested user interface includes the specified user interface element comprises accessing an xpath.

14. A non-transitory machine-readable medium that stores instructions that, when executed by one or more processors, cause the one or more processors to perform operations comprising:
receiving a request from a device for images for training a machine learning algorithm, the request specifying a user interface element and a number of images;
during a predetermined duration of time, receiving requests from other devices for user interfaces;
for each requested user interface, determining whether the requested user interface includes the specified user interface element;
for each requested user interface that is determined to include the specified user interface element, generating an image of the requested user interface that is determined to include the specified user interface element and annotation for the specified user interface element, the generating of the annotation comprising determining, by the one or more processors, coordinates of the specified user interface element in the requested user interface that is determined to include the specified user interface element; and
providing the generated images and annotation to the device for use in training the machine learning algorithm.

15. The non-transitory machine-readable medium of claim 14, wherein the determining of the coordinates of the specified user interface element in the requested user interface that is determined to include the specified user interface element comprises determining the coordinates using JavaScript to extract data from a Document Object Model (DOM) of the requested user interface that is determined to include the specified user interface element.

16. The non-transitory machine-readable medium of claim 14, wherein:
the determined coordinates for each provided image are provided in an extended Markup Language (XML) file that corresponds to the provided image.

17. The non-transitory machine-readable medium of claim 16, wherein:
a prefix of the XML file is same as a prefix of a file containing the provided image.

18. The non-transitory machine-readable medium of claim 14, wherein the operations further comprise:
training the machine learning algorithm using the provided images and determined coordinates.

19. The non-transitory machine-readable medium of claim 14, wherein the operations further comprise:
generating a portion of the requested images by modifying copies of images of requested interfaces.

20. The non-transitory machine-readable medium of claim 14, wherein:

the determining that the requested user interface includes the specified user interface element comprises accessing an xpath.

\* \* \* \* \*